United States Patent
Cai (10) Patent No.: US 7,822,998 B2
(45) Date of Patent: Oct. 26, 2010

(54) METHOD AND APPARATUS FOR THERMAL SENSITIVITY BASED DYNAMIC POWER CONTROL

(75) Inventor: Zhong-Ning (George) Cai, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 11/857,408

(22) Filed: Sep. 18, 2007

(65) Prior Publication Data
US 2008/0155288 A1    Jun. 26, 2008

Related U.S. Application Data

(63) Continuation of application No. 09/749,792, filed on Dec. 28, 2000, now abandoned.

(51) Int. Cl.
*G06F 1/08* (2006.01)

(52) U.S. Cl. .......................... 713/322; 713/300; 713/320
(58) Field of Classification Search ................. 713/300, 713/320, 322
See application file for complete search history.

(56) References Cited

U.S. PATENT DOCUMENTS

| | | | | |
|---|---|---|---|---|
| 5,233,314 A | * | 8/1993 | McDermott et al. | ........... 331/17 |
| 5,798,667 A | * | 8/1998 | Herbert | ...................... 327/573 |
| 5,940,785 A | * | 8/1999 | Georgiou et al. | ............ 702/132 |
| 5,978,864 A | * | 11/1999 | Hetherington et al. | ........ 710/18 |
| 6,192,479 B1 | * | 2/2001 | Ko | .............................. 713/300 |

* cited by examiner

*Primary Examiner*—Tse Chen
(74) *Attorney, Agent, or Firm*—Kenyon & Kenyon LLP (57) ABSTRACT

A method and system provides dynamic power control based on thermal sensitivity of a processor system. The method and system includes a circuit that reduces the clock frequency for the processor system in response to thermal characteristics satisfying a pre-determined threshold that allows maximal thermal temperature limit utilization without substantially degrading processor performance.

17 Claims, 6 Drawing Sheets

| FFRL_EN | dT/dt | THERMAL TEMPERATURE | CURRENT LOGIC STATE | PREV. LOGIC STATE |
|---|---|---|---|---|
| 0 (NOT NEAR MAXIMAL THERMAL LIMIT) | NOT CARE | NOT CARE | POWER DOWN | POWER DOWN |
| 0 (NOT NEAR MAXIMAL THERMAL LIMIT) | NOT CARE | NOT CARE | POWER DOWN | WAIT |
| 0 (NOT NEAR MAXIMAL THERMAL LIMIT) | NOT CARE | NOT CARE | POWER DOWN | ACTIVE |
| 1 (NEAR MAXIMAL THERMAL LIMIT) | >0.2 (SLOW RATE) | <MAX. TEMPERATURE−δt | WAIT | POWER DOWN |
| 1 (NEAR MAXIMAL THERMAL LIMIT) | <0.2 (SLOW RATE) | <MAX. TEMPERATURE−δt | WAIT | ACTIVE |
| 1 (NEAR MAXIMAL THERMAL LIMIT) | >0.2 (SLOW RATE) | <MAX. TEMPERATURE−δt | WAIT | WAIT |
| 1 (NEAR MAXIMAL THERMAL LIMIT) | NOT CARE | >MAX. TEMPERATURE−δt | ACTIVE | POWER DOWN |
| 1 (NEAR MAXIMAL THERMAL LIMIT) | NOT CARE | >MAX. TEMPERATURE−δt | ACTIVE | WAIT |
| 1 (NEAR MAXIMAL THERMAL LIMIT) | NOT CARE | >MAX. TEMPERATURE−δt | ACTIVE | ACTIVE |

METHOD AND APPARATUS FOR THERMAL SENSITIVITY BASED DYNAMIC POWER CONTROL

RELATED APPLICATIONS

This application is a Continuation of U.S. patent application Ser. No. 09/749,792 filed on Dec. 28, 2000.

BACKGROUND OF THE INVENTION

1. Field of the Invention

The present invention relates generally to a processor system. It particularly relates to a method and system for processor dynamic power control based on thermal sensitivity.

2. Background

Power consumption in current high-performance processor systems often leads to high temperatures for the processor components. The high processor temperatures, especially for processors using surface-mounted technology, leads to power feedback due to failures (e.g., shorts) produced in the processor circuits. Commonly, processor systems operate with two high temperature limits, an electrical maximum power limit, and a maximal thermal design point (maximal TDP). The lower limit, the maximal TDP, is a temperature threshold where if processor thermal (relating to heat) temperature exceeds this threshold, then the processor may continue to function but could encounter problems if operating above this temperature for any substantial amount of time. The upper limit, the electrical maximum power limit, is a temperature limit where the processor will malfunction if attempting to operate above this limit. Therefore, processor systems must reduce power consumption in response to nearing these high temperature limits to avoid malfunction. A traditional method was to completely shut down the processor (stop-clock method) allowing the processor temperatures to cool below the high temperature limits before the processor is re-started. However, completely shutting down the processor and having to wait for re-start severely degrades processor system performance.

Figure 1:
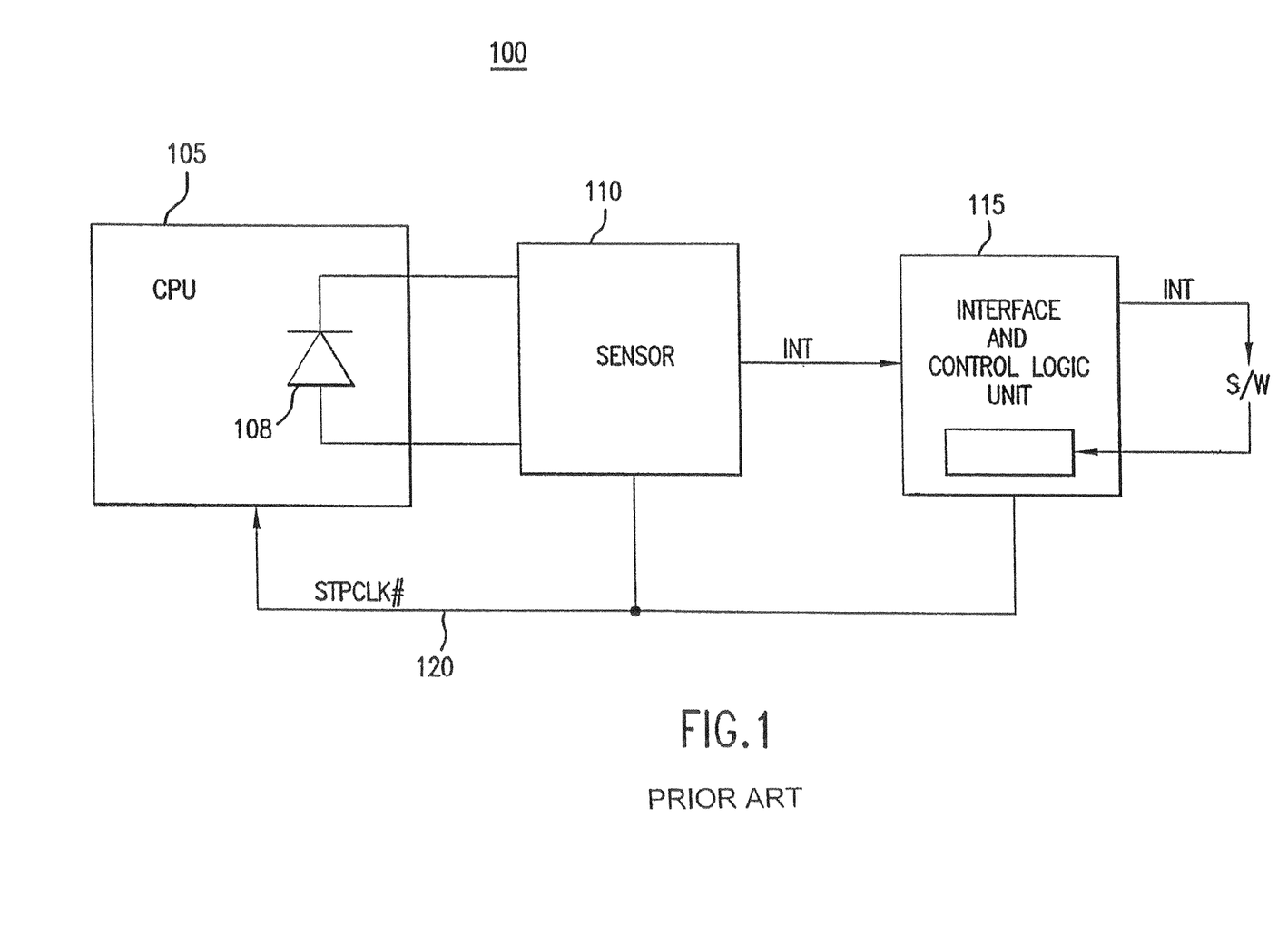
FIG. 1 shows an exemplary prior art power reduction architecture

Current processor systems use a common method (measured temperature compared to threshold) for reducing power consumption (thermal throttling) in response to thermal temperature limits being neared or exceeded. FIG. 1 shows an exemplary architecture 100 for a current processor thermal throttling method that is an extension of the traditional stop-clock function. The thermal throttling architecture 100 includes CPU (central processing unit) 105, intercoupled to thermal sensor 110, and intercoupled to interface and control logic unit 115. Using this architecture 100, there are two ways to stop the CPU 105 clock in response to high temperatures. A first way is to provide interface and control logic unit 115 with a software/firmware program that is called when sensor 110 detects thermal temperatures above a predetermined threshold (e.g., maximal thermal temperature limit) on CPU 105 using an internal diode 108, and internal logic. The software/firmware routine, when called, triggers the thermal throttling mechanism by sending a stop-clock signal 120 from interface and control logic unit 115 that stops the processor clock and the internal architecture states of the microprocessor will remain in predefined states until either the thermal temperature decreases below the pre-determined threshold or the maximal thermal throttling time interval is reached. Alternatively, the stop-clock signal 120 may be generated internally by the sensor 110 to be sent directly from the sensor 110 to internal clock control logic of CPU 105 to stop the CPU clock. This drastic measure (completely shutting down the processor clock in response to the software routine), however, generates a significant performance penalty and high processing overhead. Therefore, there is a need for an efficient power reduction method that does not generate a substantial performance penalty for the processor system

DETAILED DESCRIPTION

Figure 2:
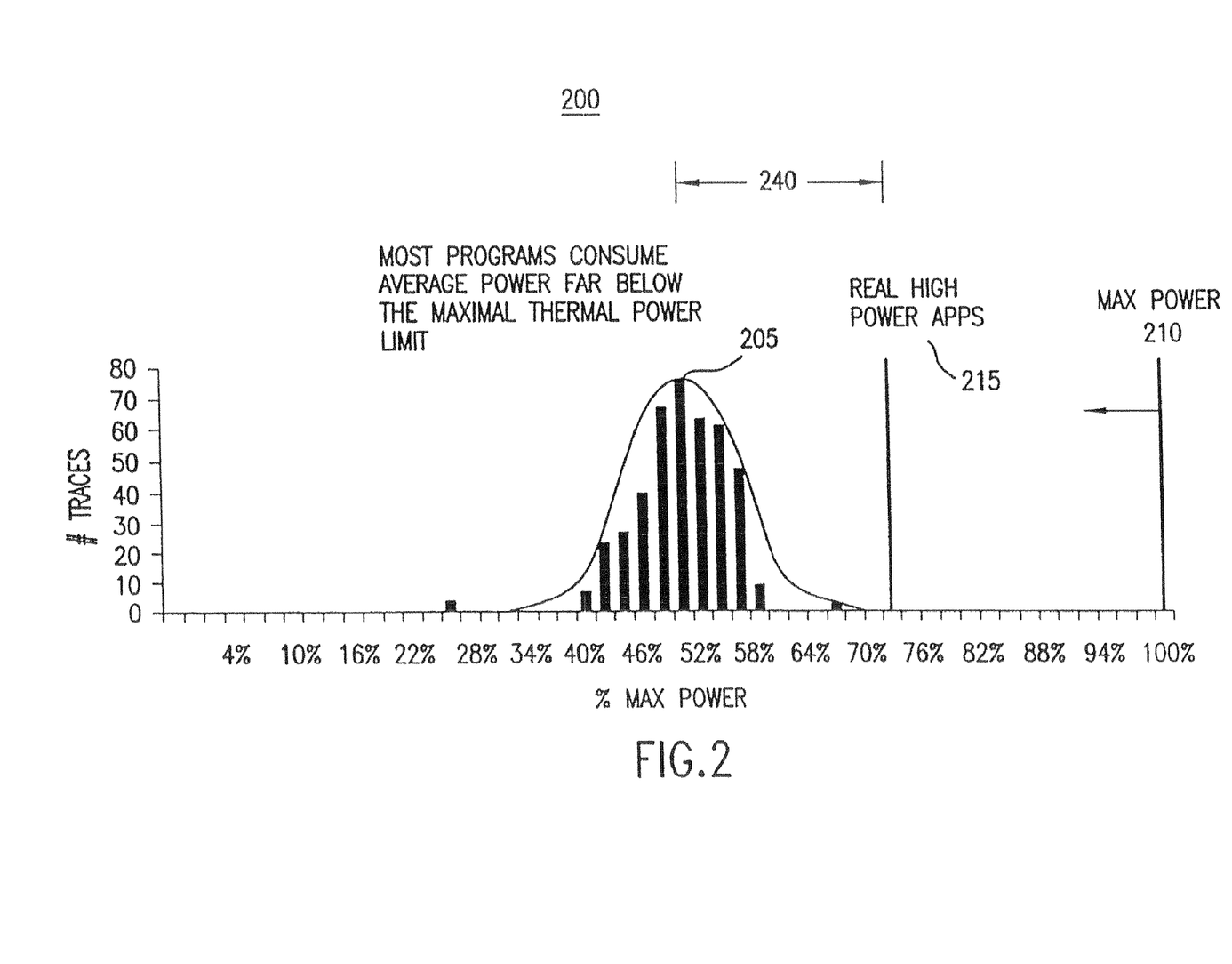
FIG. 2 shows an exemplary graph of average power consumption in accordance with embodiments of the present invention

FIG. 2 shows an exemplary graph 200 of power consumption for processor systems in accordance with embodiments of the present invention. As shown in FIG. 2, the average power consumption 205 for processing of most programs is 52% of the maximum power limit (e.g., electrical maximum power limit) 210. Typically, the maximal thermal design point (TDP) power limit is 75%-80% of the maximum power limit 210. Therefore, high power consumption mostly results from high-power spikes (can be random or uniform) of significant power consumption, an example being the real high power application spike 215 shown at 72% of the maximum power limit 210.

A non-uniform (random) distribution of these spikes or a close distribution of these high-power spikes within a short period of time may cause the maximal thermal temperature limit (e.g., electrical maximum power limit) for a processor to be exceeded and therefore trigger thermal throttling (reduction of power consumption). However, as shown in FIG. 2, this period of high-power consumption does not occur frequently as most processor programs consume power at an average of 52% (205) of the maximum power limit 210. Therefore, only a short power-down period is necessary for the processor to return to average levels of power consumption well within the maximum power limit 210. In references to FIG. 2, assuming thermal throttling is triggered by the real high power spikes, there is a small design range 240 between the average power consumption (52%) and the real high power applications (72%) allowing processor operation within range 240 without triggering thermal throttling if higher levels of power consumption are not reached past level 215.

Figure 3:
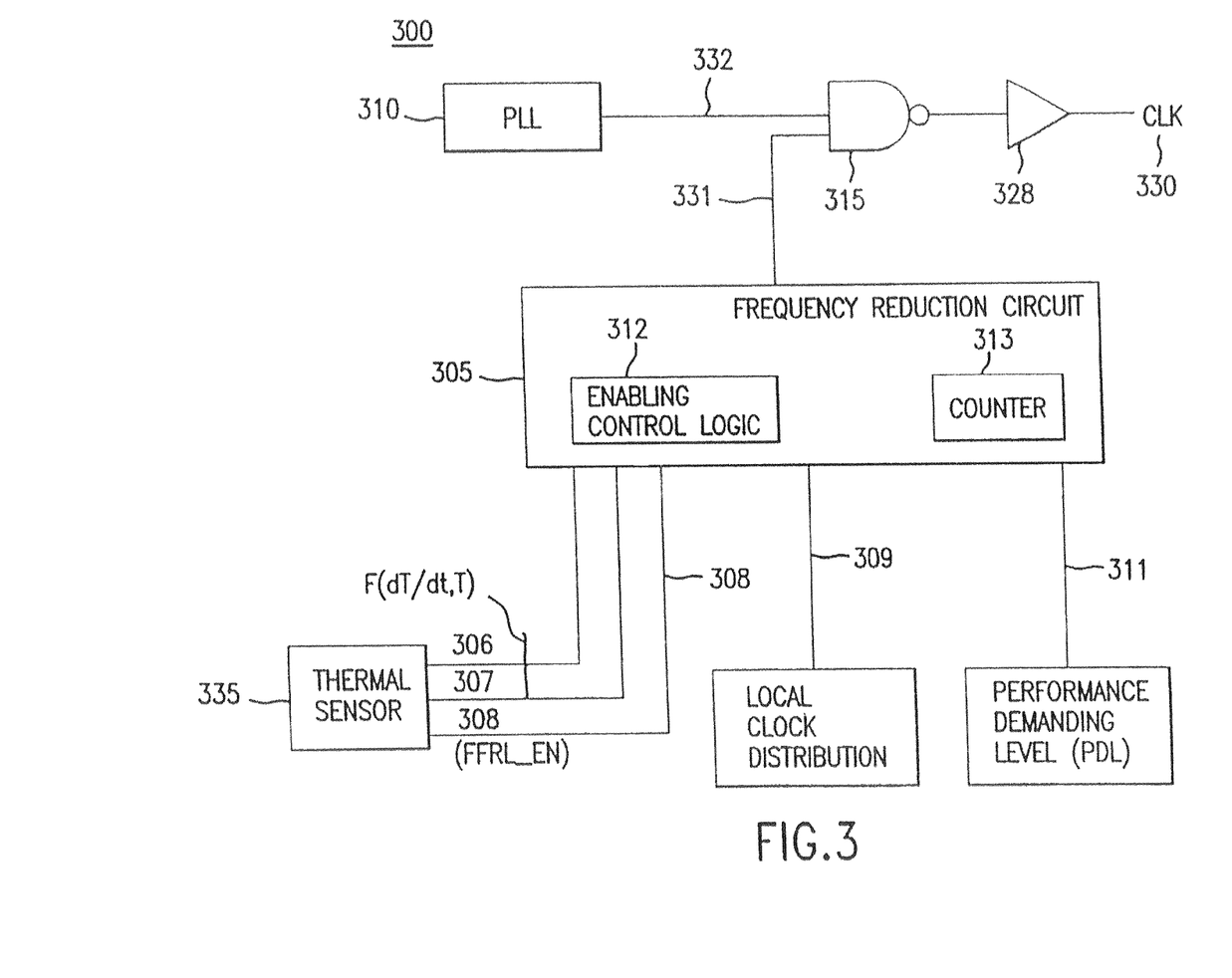
FIG. 3 shows an exemplary processor system architecture for reducing power consumption in accordance with embodiments of the present invention

In accordance with embodiments of the present invention, FIG. 3 shows an exemplary processor system architecture 300 for reducing power consumption by rapidly reducing the clock frequency for the processor system during these periods of high-power spikes and then resuming regular (non-reduced) clock frequency after the high (danger) temperature period has completed. The intercoupled processor architecture 300 includes processor component (die) thermal sensor 335, intercoupled to frequency reduction circuit 305, logic circuit 315 intercoupled to PLL (phase-locked loop) circuit 310 and frequency reduction circuit 305 and may optionally include inverter 328 intercoupled to logic circuit 315 for outputting a stable timing signal (the clock frequency signal—clk) 330 for the processor system 300. Frequency reduction circuit 305 may include a counter 313 (e.g., four-bit circular counter) and enabling control logic 312.

During operation, frequency reduction circuit 305 advantageously receives five input signals 306, 307, 308, 309, and 311. The input signals include two-bit thermal temperature change speed (dT/dt) information (e.g., F(dT/dt, T)) 306, 307 and frequency reduction enabling control signal (FFRL_EN) 308 where both signals are received from processor component (die) thermal sensor 335. The other input signals include local clock distribution signal 309, and performance demanding level (PDL) signal 311.

The frequency reduction enabling control signal 308 is input by the die sensor 335 and may be asserted (by the die sensor 335) when the processor component (die) temperature has satisfied a pre-determined temperature threshold. This pre-determined temperature threshold may be a threshold close to a maximum thermal temperature limit (e.g., proportionate to electrical maximum power limit).

Advantageously, F(dT/dt, T) is a function of the rate of temperature change and thermal temperature of the processor components as measured and calculated by the thermal sensor 335 and fed (e.g., as two bits) to the frequency reduction circuit as input signals 306, 307. Two bits may be used for input signals 306, 307 where one bit may indicate a pre-determined temperature threshold being satisfied or not satisfied (e.g., "0" for not satisfied, and "1" for satisfied), and the other bit indicates a rate of temperature change being satisfied or not satisfied. Alternatively, the two bits may form a two-bit code requiring decoding by the control logic 312 of the frequency reduction circuit 305. Assuming the first two-bit method is followed, F(dT/dt, T) input signals 306, 307 will be asserted when a pre-determined rate of temperature change/temperature threshold is satisfied. As described further with reference to FIGS. 5-6, input signals 306-308 provide three different control states for the frequency reduction circuit 305. Temporary frequency reduction will be triggered by all the input signals 306-308 being asserted (e.g., from the pre-determined temperature and rate of temperature change/temperature thresholds being satisfied as caused by a high-power spike) and continue until the high-power spike period passes and the thresholds are no longer satisfied (e.g., not reached or exceeded).

Advantageously, in a Power Down state, the frequency reduction circuit 305 is disabled and a normal operation (non-reduced) clock frequency signal is output from logic circuit 315 and inverter 328. Alternatively, when the input signal 308 is asserted (e.g., value of "1"), depending on the die temperature change rate as measured by the die sensor 335, the frequency reduction circuit may be either in a Wait state or an Active state. In the Wait state, the frequency reduction circuit 305 is in a logic ready state for frequency scaling. From this state, the frequency reduction circuit 305 can rapidly proceed to actual frequency reduction. In the Active state, the frequency reduction circuit 305 actively reduces the clock frequency output signal 330 and maintains the scaled-down frequency during execution (during the period) of this frequency reduction.

Advantageously, local clock distribution signal 309, may be a stable local clock signal (showing low jitter) and may be generated from the PLL 310 in combination with anti-skew logic circuitry. Alternatively, local clock distribution signal 309 may be received directly from the PLL 310. Input clock signal 309 may be used by the frequency reduction circuit 305 for determining the timing alignment of frequency reduction (e.g., level of granularity of frequency reduction) in relation to the PLL output signal 332.

The performance demanding level signal (PDL) 311 is an input signal used by the frequency reduction circuit 305 to determine the level of sensitivity (or aggression) used for frequency reduction. If PDL signal 311 is asserted (e.g., value of "1"), then frequency reduction cannot be aggressive and instead fine granularity must be used (e.g., 1/15 reduction from normal clock frequency) for reducing the normal clock frequency. Alternatively, if PDL signal 311 is not asserted (e.g., value of "0"), then frequency reduction can be aggressive and higher percentages of frequency reduction (e.g., close to 50% reduction from normal clock frequency) may be used for reducing the normal clock frequency. Advantageously, the PDL signal 311 can be used as a form of hardware performance profiling for system components interconnected to processor architecture 300. In an exemplary scenario, during a period of frequency reduction in response to high temperatures, if a hardware component running an application (e.g., hard drive) does not require as close to possible full processor speed (e.g., 1 Gigahertz—GHz), then aggressive frequency reduction may be performed (e.g., close to 50% reduction, 550 MHz) and the PDL signal 311 is not asserted. Alternatively, if the hardware component does require as close to possible full processor speed for running its application during the high temperature period, then fine granularity of frequency reduction (e.g., 5% reduction, 950 MHz) must be performed and the PDL signal 311 is asserted.

During operation, in accordance with embodiments of the present invention, PLL 310 outputs a normal clock frequency signal 332 (e.g., 1 GHz) for the processor system 30Q that is input to logic circuit 315. In response to input signals 306, 307, 308, 309, 311 and using counter 313 and enabling control logic 312, frequency reduction circuit 305 outputs an enabling signal 331 that is asserted (e.g., value of "0") when frequency reduction is to be performed. Counter 313 may be used for timing alignment (granularity) of the frequency in relation to the thermal response time (e.g., delay in receiving temperature and rate of temperature change information from die sensor 335) or some other pre-determined time interval, and enabling control logic 312 may be used to output a "0" for asserting frequency reduction. Using an exemplary NAND gate as logic circuit 315, when enabling signal 331 is asserted (value of "0"), then the output clock signal 330, via logic circuit 315 and inverter 328, for the processor system 300 will be low for the period of frequency reduction. This forced low period for the output clock signal 330 effectively removes switching transitions from the clock signal to reduce the clock frequency signal 330 by a pre-determined percentage of the normal (non-reduced) clock frequency 332. Alternatively, when enabling signal 331 is not asserted (e.g., value of "1"), then the normal clock frequency will be output as clock signal 330 from the logic circuit 315 and inverter 328 since an input of "1" from enabling signal 331 instructs the logic circuit 315 (assuming a NAND gate) and inverter 328 to generate the normal clock frequency output signal 332 from PLL 310.

Figure 4:
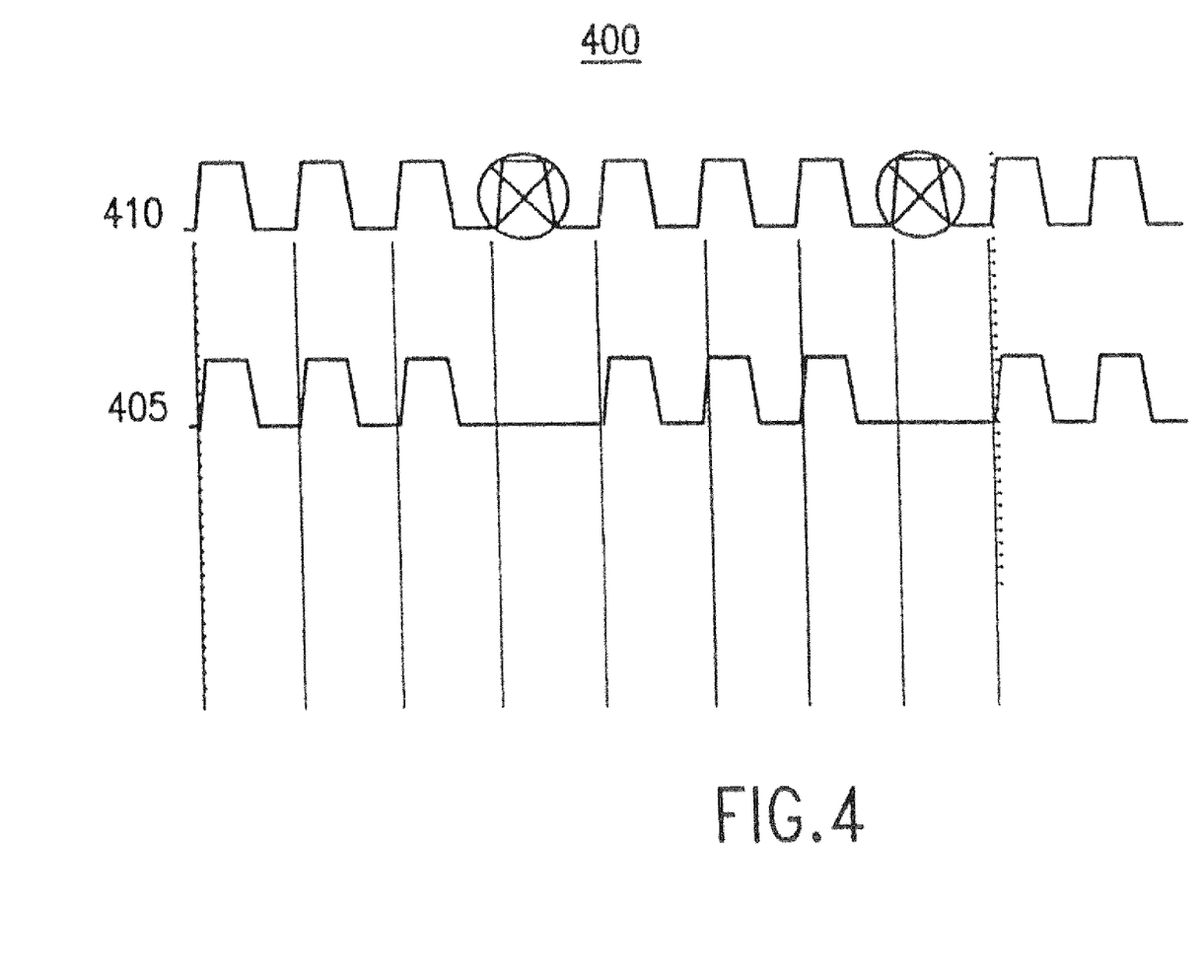
FIG. 4 shows a timing signal diagram in accordance with embodiments of the present invention

An exemplary timing diagram 400 of the clock frequency signals 405, 410 generated by the processor architecture 300 of FIG. 3 is shown in FIG. 4. The frequency reduction circuit 305 includes enabling control logic 312 to produce rapid frequency reduction, in response to processor component temperatures nearing a pre-determined maximum temperature limit, to "glide" the processor system 300 out of the thermal throttle risk region. During operation, when the rapid frequency reduction is not enabled (thresholds not satisfied), the control logic 312 of frequency reduction circuit 305 outputs a high ("1") enabling signal 331 to produce the normal (non-reduced) operation clock frequency signal using logic circuit 315 and inverter 328, an example being clock frequency signal 410 (e.g. 1 GHz). When the temperature and rate of temperature change thresholds are satisfied (e.g., reached or exceeded) as indicated by input signals 306-308, then the control logic 312 of frequency reduction circuit 405 outputs a low ("0") enabling signal 331 to rapidly switch from the normal clock frequency to a reduced frequency (using logic circuit 315 and inverter 328), advantageously less than 50% reduced from the normal clock frequency, without a long sequence of resynchronization cycle penalty where an example is clock frequency signal 405. As shown, reduced clock frequency signal 405 is produced by removing a pre-determined number of switching transitions (e.g., 2 transitions from every 10 cycles) from the clock frequency cycles during a given time interval which reduces the number of clock cycles in average. This method of reduction produces a fast reduction in clock frequency while still generating a high clock frequency signal not substantially reduced from the normal clock frequency. A fine granularity of frequency reduction may be produced (e.g., 1/10, 1/16) by the frequency reduction circuit 305 where the removal of 1 switching transition from every 10 clock cycles produces a 1/10 reduction (e.g., 10%) from the normal (non-reduced) clock frequency. Advantageously, using a four-bit counter for counter 313, various multiples of two reduction may be provided by frequency reduction circuit 305 (e.g., 1/16, 1/8, etc.).

Advantageously, in accordance with embodiments of the present invention, frequency reduction from the normal clock frequency is solely performed by reducing the number of switching transitions per number of cycles on average. Preferably, other parameters from the normal (non-reduced) clock frequency signal remain the same including, but not limited to duty cycle, rising time, and falling time, and other parameters of the normal clock frequency signal.

Figure 5:
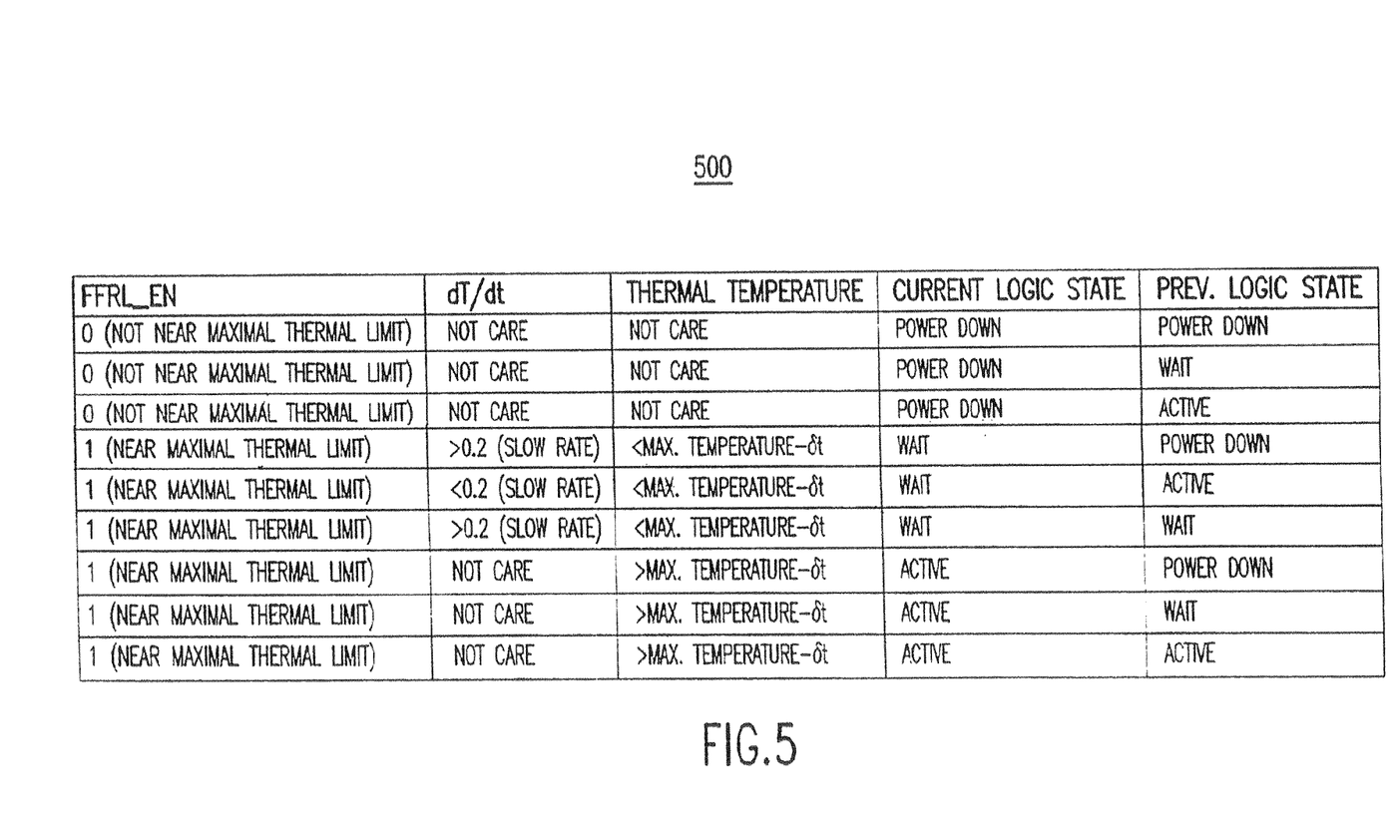
FIG. 5 shows a state machine chart in accordance with embodiments of the present invention
Figure 6:
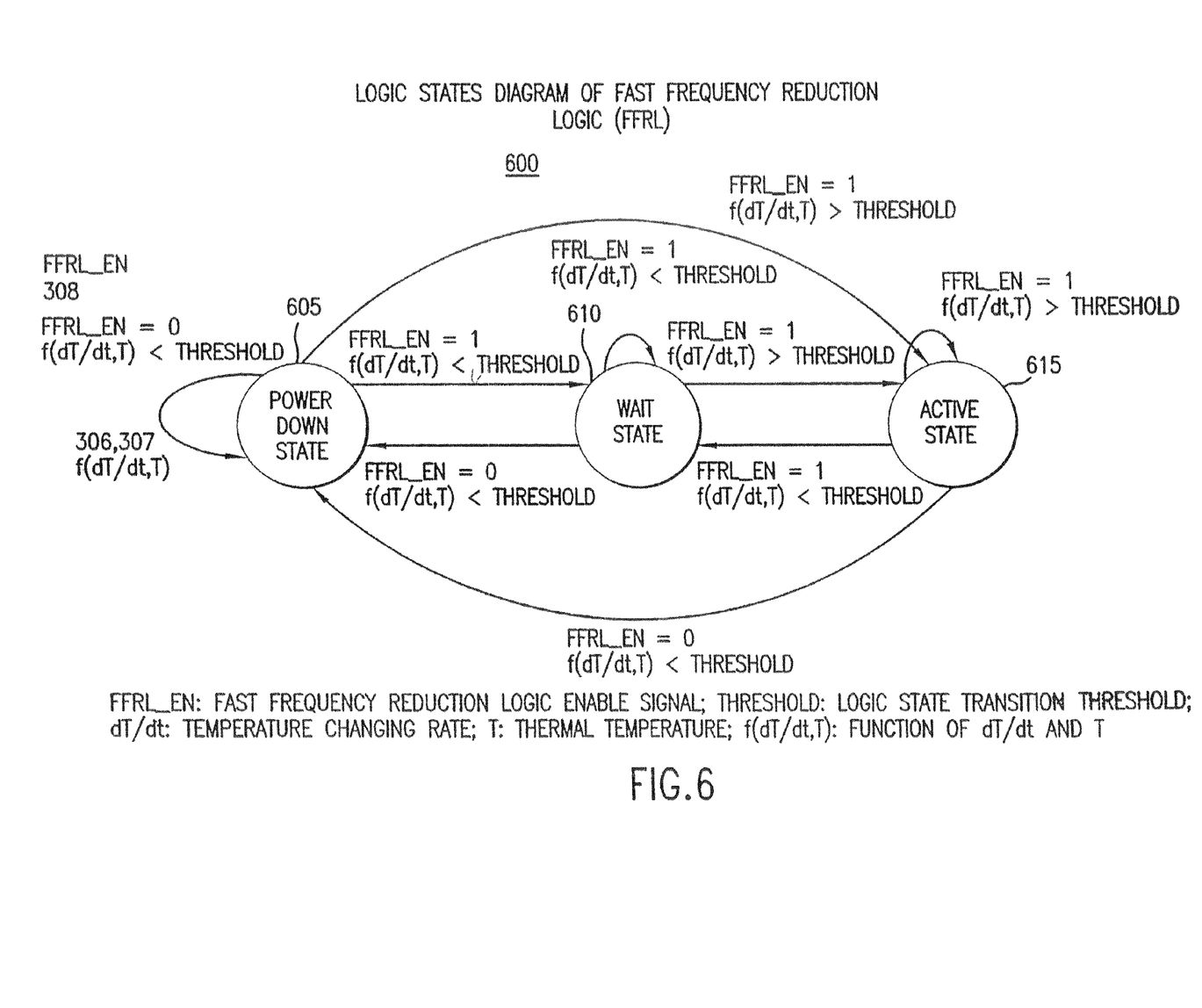
FIG. 6 shows a state machine diagram in accordance with embodiments of the present invention

FIGS. 5 and 6 show the state machine chart 500 and diagram 600 followed by the control logic 312 of the frequency reduction circuit 305 in architecture 300 in FIG. 3. Advantageously, the state machine may be implemented in silicon as part of frequency reduction circuit 305. Advantageously, during operation of the state machine, measurements (taken from die thermal sensor 335 in the processor architecture 300) of the thermal temperature of the processor components and rate of temperature change are being taken with input signals 306-308 (FFRL_EN, F(dT/dt, T)) sent to the frequency reduction circuit 305. These input signals are asserted or not asserted by the die sensor 335 in response to these measurements satisfying pre-determined thresholds for temperature (e.g., maximum temperature limit corresponding to electrical maximum power limit) and rate of temperature change/temperature.

As shown in FIG. 6, the state machine followed by control logic 312 in frequency reduction circuit 305 may proceed in either of three paths from the power down state 605 of the frequency reduction circuit 305 in FIG. 3. Firstly, if neither threshold is satisfied, the frequency reduction control logic 312 will remain in the power down state (output a "1" for enabling signal 331) as none of the enabling signals 306, 307, 308 from FIG. 3 are asserted (e.g., value of "0"). The PLL 310 will continue to output the full (e.g., normal, non-reduced) clock frequency 410 from FIG. 4. Secondly, when both the die (processor components) temperature is close to a pre-determined maximum temperature limit and the rate of temperature change threshold is satisfied (as measured by thermal sensor 335), both the frequency reduction enabling signal 308 and both the function enabling input signals 306, 307 are asserted (e.g., value of "1") by the thermal sensor 335 and the frequency reduction control logic 312 (state machine) may proceed to the active state 615. When entering the active state 615, frequency reduction occurs and the clock frequency signal output 330 is rapidly reduced by removing switching transitions as described previously using the frequency reduction circuit 305, logic circuit 315, and inverter 328. Thirdly, from the power down state 605, if the thermal temperature threshold is neared but the rate of temperature change is not satisfied, the control logic 312 may enter the wait state 610 as enabling signal 308 is asserted by the die thermal sensor 335. The normal (non-reduced) clock frequency will be produced as output clock signal 330.

At the wait state 610, control logic 312 again may proceed in either of three ways. Firstly, if the rate of temperature change threshold is still not satisfied, but the enabling signal 308 is still asserted (thermal temperature threshold still satisfied), then the control logic will continue in the wait state 610 and the normal clock frequency will continue to be produced as output clock signal 330. Secondly, if the enabling signal 308 is no longer asserted and the rate of temperature change threshold is still not satisfied, then control logic will go back to the power down state 605 and the normal clock frequency will continue to be produced as output clock signal 330. Thirdly, if the function input signals 306, 307 become asserted (rate of temperature change threshold is satisfied) and the enabling signal 308 is still asserted, then control logic 312 enters the active state 615 where clock frequency reduction rapidly occurs by removing switching transitions as described previously using the frequency reduction circuit 305, logic circuit 315, and inverter 328. The reduced clock frequency signal is produced as output clock signal 330.

The wait state 610 is necessary because the thermal response time (time delay in receiving a temperature reading from the die thermal sensor 335) may be substantial (e.g., long period), especially for a GHz speed processor system. Therefore, it is necessary for the frequency reduction circuit 305 to be enabled (at logic ready) in wait state 610 (not powered down as in power down state 605) and ready to proceed to the active state 615 for rapid reduction of frequency in response to the rate of temperature threshold being satisfied as indicated by input signals 306, 307. Advantageously, in accordance with embodiments of the present invention, the control logic 312 of frequency reduction circuit 305, from wait state 610, provides rapid switching from the normal clock frequency 410 (as shown in FIG. 4) to the reduced clock frequency 405 (as shown in FIG. 4) to quickly reduce power consumption and avoid system malfunction from the processor system operating above maximal thermal limits.

At the active state 615, control logic 312 again may proceed in either of three ways. Firstly, if enabling signals 306-308 are still asserted (both thresholds still satisfied), then the control logic 312 will remain in the active state 615 and generation of the reduced clock frequency will continue. Secondly, if enabling signal 308 is still asserted, but the rate of temperature change falls under (fails to satisfy) the pre-determined threshold (function signals 306, 307 not asserted), then control logic 312 will proceed back to the wait state 610 and normal clock frequency 410 will be produced. Thirdly, if enabling signals 306-308 become not asserted (both thresholds are no longer satisfied), then the control logic 312 will proceed back to the power down state 605 and the normal (non-reduced) clock frequency generated by PLL 310 will be produced as output clock signal 330.

The control logic 312 of frequency reduction circuit 305 may be implemented using a special clock gating logic to a PLL clock distribution tree which does not change clock duty cycle nor reduce the clock cycle time. Several advantages are realized using the frequency reduction circuit 305 to provide rapid frequency reduction in response to the thermal thresholds being satisfied. By reducing frequency through removing a number of pre-determined switching transitions from existing clock frequency cycles during a given time interval, a near peak clock frequency is maintained as well as high processor performance. The control logic allows for rapid switching between the peak frequency and the target (reduced) frequency which enables a controlled, dynamic maximal thermal temperature management method with fine granularity.

As shown in FIG. 2, high-power spikes corresponding to spikes of thermal temperature can occur within a short time period (e.g. from 100 to 1000 frequency cycles). If the power spikes are uniformly distributed, they will not cause any thermal throttling to occur and therefore processor performance (clock frequency) is maintained. Alternatively, if several power spikes occur close to each other in a short time period, then the previously high temperature does not have a chance to dissipate and the maximal thermal temperature may be exceeded. Use of the frequency reduction method described herein allows the clock frequency signal to be quickly reduced as soon as the high-power spike occurs while the thermal temperature is near the maximal thermal temperature limit. The control logic 312 allows the processor to continue running at the maximal achievable frequency gliding through the high-power spike period with minimal performance penalty.

Additionally, with the exemplary architecture described herein in FIG. 3, the frequency reduction logic enabling condition can be easily modified to allow frequency scaling at different power levels and with a different reduction incremental interval (e.g., more or fewer switching transitions per number of cycles removed). Also, the exemplary architecture described herein can be easily integrated into current processor systems without abundant overhead to help meet processor system, power requirements.

Additionally, embodiments of the present invention may include a machine-readable medium having stored thereon a plurality of executable instructions, the plurality of instructions including instructions to perform the method described herein to reduce sensitivity to temperature for a processor system.

Although the invention is primarily described herein using particular examples of clock frequency reduction, it will be appreciated by those skilled in the art that modifications and changes may be made without departing from the spirit and scope of the present invention. As such, the method and apparatus described herein may be equally applied to any processor system that reduces clock frequency in response to multiple thermal temperature thresholds being satisfied.

What is claimed is:

1. An apparatus for dynamic power control of a processor based on a thermal condition, comprising: a sensor to measure a thermal characteristic of a processor with a clock frequency; a circuit, to reduce the clock frequency of the processor responsive to the measured thermal characteristic satisfying a pre-determined threshold, the circuit including a performance demanding level input to determine a rate of the temperature-related frequency reduction; wherein the performance demanding level input is independent of the measured thermal characteristic.

2. The apparatus of claim 1, wherein the thermal characteristic includes temperature and rate of temperature change.

3. The apparatus of claim 1, wherein the circuit includes a frequency generator and a logic circuit.

4. The apparatus of claim 1, wherein the circuit reduces the clock frequency by less than fifty percent.

5. The apparatus of claim 1, wherein the circuit reduces the clock frequency by removing a pre-determined number of transitions from a signal producing the clock frequency.

6. The apparatus of claim 1, wherein the sensor and circuit produce a higher operating temperature for the processor.

7. A method for dynamic power control of a processor based on a thermal condition, comprising: measuring a thermal characteristic of a processor with a clock frequency; reducing the clock frequency in response to the measured thermal characteristic satisfying a pre-determined threshold, and in accordance with a performance demanding level input value that determines a rate of the temperature-related frequency reduction; wherein the performance demanding level input value is independent of the measured thermal characteristic.

8. The method of claim 7, wherein the step of measuring includes measuring temperature and rate of temperature change.

9. The method of claim 7, wherein the step of reducing includes reducing the clock frequency by less than fifty percent.

10. The method of claim 7, wherein the step of reducing includes reducing the clock frequency by removing a pre-determined number of transitions from a signal producing the clock frequency.

11. The method of claim 10, wherein the step of reducing includes reducing the clock frequency in response to the measured thermal characteristic satisfying a pre-determined threshold to produce a higher operating temperature of the processor.

12. A method for using control logic to provide dynamic power control of a processor based on a thermal condition, comprising: entering a first state from a second state in response to a measured thermal characteristic of a processor with a clock frequency failing to satisfy a first pre-determined threshold where the first state outputs the clock frequency for the processor and the second state reduces the clock frequency for the processor; remaining in the first state in response to a measured thermal characteristic of the processor failing to satisfy the first pre-determined threshold; and entering the second state from the first state in response to a measured thermal characteristic of the processor satisfying the first pre-determined threshold, and in the second state, performance frequency reduction in accordance with a performance demanding level input value that determines a rate of the temperature-related frequency reduction; wherein the performance demanding level input is independent of the measured thermal characteristic.

13. The method of claim 12, wherein the thermal characteristic of the processor includes temperature and rate of temperature change.

14. The method of claim 12, further comprising:
entering a third state from the first state in response to a measured thermal characteristic of the processor satisfying a second pre-determined threshold where the third state waits for a measured thermal characteristic of the processor to satisfy a third pre-determined threshold to reduce the clock frequency for the processor;
remaining in the third state in response to a measured thermal characteristic of the processor failing to satisfy the third pre-determined threshold; and entering the first state from the third state in response to a measured thermal characteristic failing to satisfy the second pre-determined threshold.

15. The method of claim 14, wherein the second pre-determined threshold is a temperature threshold, and the third pre-determined threshold is a rate of temperature change threshold.

16. The method of claim 14, further comprising:

entering the second state from the third state in response to a measured thermal characteristic of the processor satisfying the third pre-determined threshold;

remaining in the second state in response to a measured thermal characteristic of the processor satisfying the third pre-determined threshold; and entering the third state from the second state in response to a measured thermal characteristic of the processor failing to satisfy the second pre-determined threshold.

17. The method of claim 16, wherein the second pre-determined threshold is a temperature threshold, and the third pre-determined threshold is a rate of temperature change threshold.

* * * * *